US008888176B2

(12) United States Patent
Kaku et al.

(10) Patent No.: US 8,888,176 B2
(45) Date of Patent: Nov. 18, 2014

(54) VEHICLE SEAT

(75) Inventors: Hiroyuki Kaku, Tochigi (JP); Jogen Yamaki, Saitama (JP); Hisato Oku, Saitama (JP)

(73) Assignees: TS Tech Co., Ltd., Saitama (JP); Honda Motor Co., Ltd., Tokyo (JP)

( * ) Notice: Subject to any disclaimer, the term of this patent is extended or adjusted under 35 U.S.C. 154(b) by 61 days.

(21) Appl. No.: 13/808,826

(22) PCT Filed: Jul. 6, 2011

(86) PCT No.: PCT/JP2011/065440
§ 371 (c)(1),
(2), (4) Date: Jan. 7, 2013

(87) PCT Pub. No.: WO2012/005279
PCT Pub. Date: Jan. 12, 2012

(65) Prior Publication Data
US 2013/0106151 A1    May 2, 2013

(30) Foreign Application Priority Data
Jul. 9, 2010    (JP) .................................. 2010-157266

(51) Int. Cl.
*B60N 2/42* (2006.01)
*B60R 21/00* (2006.01)
*B60N 2/68* (2006.01)

(52) U.S. Cl.
CPC .............. *B60N 2/4235* (2013.01); *B60N 2/682* (2013.01)
USPC ................ 297/216.13; 297/452.18; 297/452.2

(58) Field of Classification Search
CPC .. B60N 2/4228; B60N 2/42745; B60N 2/682; B60N 2/688

USPC .............................. 297/216.13, 452.18, 452.2
See application file for complete search history.

(56) References Cited

U.S. PATENT DOCUMENTS

| 5,918,943 | A  | * | 7/1999  | Mitschelen et al. ..... 297/452.18 |
| 5,938,280 | A  | * | 8/1999  | Hoshino .................. 297/216.13 |
| 5,988,756 | A  | * | 11/1999 | Aufrere et al. ........... 297/452.18 |
| 6,299,238 | B1 | * | 10/2001 | Takagi et al. ........ 297/216.13 X |
| 6,299,239 | B1 |   | 10/2001 | Sagawa et al. |
| 6,520,577 | B2 | * | 2/2003  | Kitagawa ................. 297/216.13 |
| 6,523,892 | B1 | * | 2/2003  | Kage et al. ............... 297/216.13 |

(Continued)

FOREIGN PATENT DOCUMENTS

| JP | 2000-103275 | 4/2000  |
| JP | 2001-105947 | 4/2001  |
| JP | 2003-312340 | 11/2003 |

*Primary Examiner* — Rodney B White
(74) *Attorney, Agent, or Firm* — Hamre, Schumann, Mueller & Larson, P.C.

(57) ABSTRACT

A vehicle seat comprises: left and right side frames (4) which constitute left and right lower portions of a seat back frame (2); an inner frame (pipe frame 5) disposed adjacent to a laterally inner side of one of the side frames (4); a force-receiving member (bracket 7) disposed adjacent to a laterally outer side of the one of the side frames (4), provided discretely from the inner frame, and configured to receive a load from outside in a lateral direction; and a load transmission part (lower frame 6 and lower portion 51 of the pipe frame 5) configured to transmit the load from the force-receiving member to a side laterally opposite to that on which the force-receiving member is provided. The force-receiving member is directly fixed to the inner frame.

7 Claims, 4 Drawing Sheets

(56) References Cited

U.S. PATENT DOCUMENTS

| | | | |
|---|---|---|---|
| 6,554,356 B1 * | 4/2003 | Crose | 297/216.13 |
| 6,817,672 B2 * | 11/2004 | Matsunuma | 297/452.18 |
| 6,857,698 B2 * | 2/2005 | Saberan et al. | 297/216.13 |
| 6,921,132 B2 * | 7/2005 | Fujita et al. | 297/216.13 |
| 7,070,236 B2 * | 7/2006 | Kawashima | 297/216.13 X |
| 7,090,293 B2 * | 8/2006 | Saberan et al. | 297/216.13 |
| 7,284,800 B2 * | 10/2007 | Ishizuka | 297/452.18 |
| 7,530,633 B2 * | 5/2009 | Yokota et al. | 297/216.13 X |
| 7,690,723 B2 * | 4/2010 | Evans et al. | 297/216.13 |
| 7,971,932 B2 * | 7/2011 | Niitsuma et al. | 297/216.13 X |
| 8,132,862 B2 * | 3/2012 | Yamada et al. | 297/452.2 |
| 8,172,320 B2 * | 5/2012 | Kalinowski | 297/216.13 |
| 8,419,126 B2 * | 4/2013 | Nitsuma | 297/216.13 |
| 8,424,965 B2 * | 4/2013 | Sasaki et al. | 297/216.13 X |
| 8,474,858 B2 * | 7/2013 | Urabe et al. | 297/216.13 X |
| 8,485,606 B2 * | 7/2013 | Geisler et al. | 297/452.18 |
| 8,544,948 B2 * | 10/2013 | Nitsuma | 297/216.13 X |
| 8,678,494 B2 * | 3/2014 | Nitsuma | 297/216.13 X |
| 8,696,060 B2 * | 4/2014 | Mizobata | 297/216.13 X |
| 8,696,061 B2 * | 4/2014 | Kasama et al. | 297/216.13 X |
| 8,708,409 B2 * | 4/2014 | Nitsuma | 297/216.13 X |
| 2002/0024241 A1 | 2/2002 | Umezawa et al. | |
| 2005/0264053 A1 * | 12/2005 | Saberan et al. | 297/216.13 |
| 2007/0085397 A1 * | 4/2007 | Tanaka et al. | 297/216.13 X |
| 2008/0203786 A1 * | 8/2008 | Niitsuma et al. | 297/216.13 |
| 2010/0148546 A1 * | 6/2010 | Demontis et al. | 297/216.13 |
| 2010/0181812 A1 * | 7/2010 | Nitsuma | 297/216.13 |
| 2010/0187876 A1 * | 7/2010 | Nitsuma | 297/216.13 |

* cited by examiner

VEHICLE SEAT

TECHNICAL FIELD

The present invention relates to a vehicle seat in which a side collision load on a vehicle can be transmitted laterally from outside toward inside.

BACKGROUND ART

A vehicle seat comprising a pipe frame (inner frame) shaped like a rectangular loop, a plate-like side frame disposed adjacent to a left or right outer side of the pipe frame, and a bracket (force-receiving member) fixed to a left or right outer side of the side frame has hitherto been known in the art (see JP 2000-103275 A). To be more specific, the side frame is formed to have dimensions such that it protrudes frontward and rearward beyond the pipe frame, and the bracket is disposed in a position on an outer surface of the side frame, such that it substantially covers a front half of the pipe frame as viewed from a lateral direction, and protrudes frontward from the pipe frame.

In addition, according to this technique, a side collision load imposed on the bracket from outside in a lateral direction is transmitted via the side frame and the pipe frame to a side laterally opposite to that on which the bracket is disposed.

However, with the conventional technique, the bracket is fixed to the side frame protruding frontward and rearward beyond the pipe frame, and there would thus be a risk of deformation of the side frame which would appear depending upon an angle or a magnitude of the side collision load received, as would make the side frame unable to transmit the load properly. Particularly, in a case where the pipe frame is cylindrical, because the side frame would quite likely deform along this cylindrical surface, this risk would be more likely to be incurred.

Against this backdrop, the inventors named in the present application have created the present invention in an effort to provide a vehicle seat in which the transmission of the load can be achieved satisfactorily.

SUMMARY OF INVENTION

Specifically, a vehicle seat according to one aspect of the present invention comprises: left and right side frames which constitute left and right lower portions of a seat back frame; an inner frame disposed adjacent to a laterally inner side of one of the side frames; a force-receiving member disposed adjacent to a laterally outer side of the one of the side frames, provided discretely from the inner frame, and configured to receive a load from outside in a lateral direction; and a load transmission part configured to transmit the load from the force-receiving member to a side laterally opposite to that on which the force-receiving member is provided. The force-receiving member is directly fixed to the inner frame.

With this configuration, the force-receiving member is not fixed through the side frame but fixed directly to the inner frame, and thus, irrespective of the angle and magnitude of the side collision load received, the load can be transmitted properly from the force-receiving member to the inner frame without getting affected by deformation of the side frame.

In the above configuration, the force-receiving member and the inner frame may be fixed together through an opening formed in the side frame.

With this feature, the need, for example, to divide the side frame into front and rear parts or upper and lower parts so as to detour around a position in which the force-receiving member and the inner frame are fixed together can be obviated, and thus the rigidity of the side frame can be enhanced.

The force-receiving member may include an extension portion provided on a laterally inner side of the force-receiving member and extending through the opening to the inner frame, and the extension portion may be fixed to the inner frame.

With this feature, the opening may be formed so that not an entire region but part of the side of the force-receiving member is detoured around; therefore, the opening can be designed to be smaller, so that the rigidity of the side frame can be further enhanced.

The opening may preferably but not necessarily be a through hole.

With this feature, the rigidity of the side frame can be further enhanced, in comparison with a configuration in which the opening is shaped as a groove (or a hollow) that opens to the front or to the rear, because an upper portion and a lower portion of the side frame above and below the position in which the force-receiving member and the inner frame are fixed together can be connected at the front and rear sides of that position (through hole).

The inner frame may be configured such that at least a portion thereof to which the force-receiving member is fixed has a shape with a closed section.

With this feature, the load received by the force-receiving member can be received by the closed section shaped inner frame which can be resistant to deformation, so that the load can be transmitted properly from the inner frame to the load transmission part.

The force-receiving member may be configured to be fixed directly to both of the side frame and the inner frame.

With this feature, the load received by the force-receiving member is transmitted not only through the inner frame but also through the side frame, and thus more effective transmission of the load can be ensured.

The inner frame may be configured such that a center in a front-rear direction thereof is located within a width in the front-rear direction of the force-receiving member.

With this feature, upon side collision, the load can be transmitted more effectively from the force-receiving member to the inner frame.

The force-receiving member may be fixed to a portion at a center in a front-rear direction of the inner frame.

With this feature, the load from the force-receiving member is transmitted intensively to the center in the front-rear direction of the inner frame, and thus the load can be transmitted more effectively.

MODE(S) FOR CARRYING OUT THE INVENTION

Hereafter, a description will be given of one embodiment of the present invention with reference to the drawings.

Figure 1:
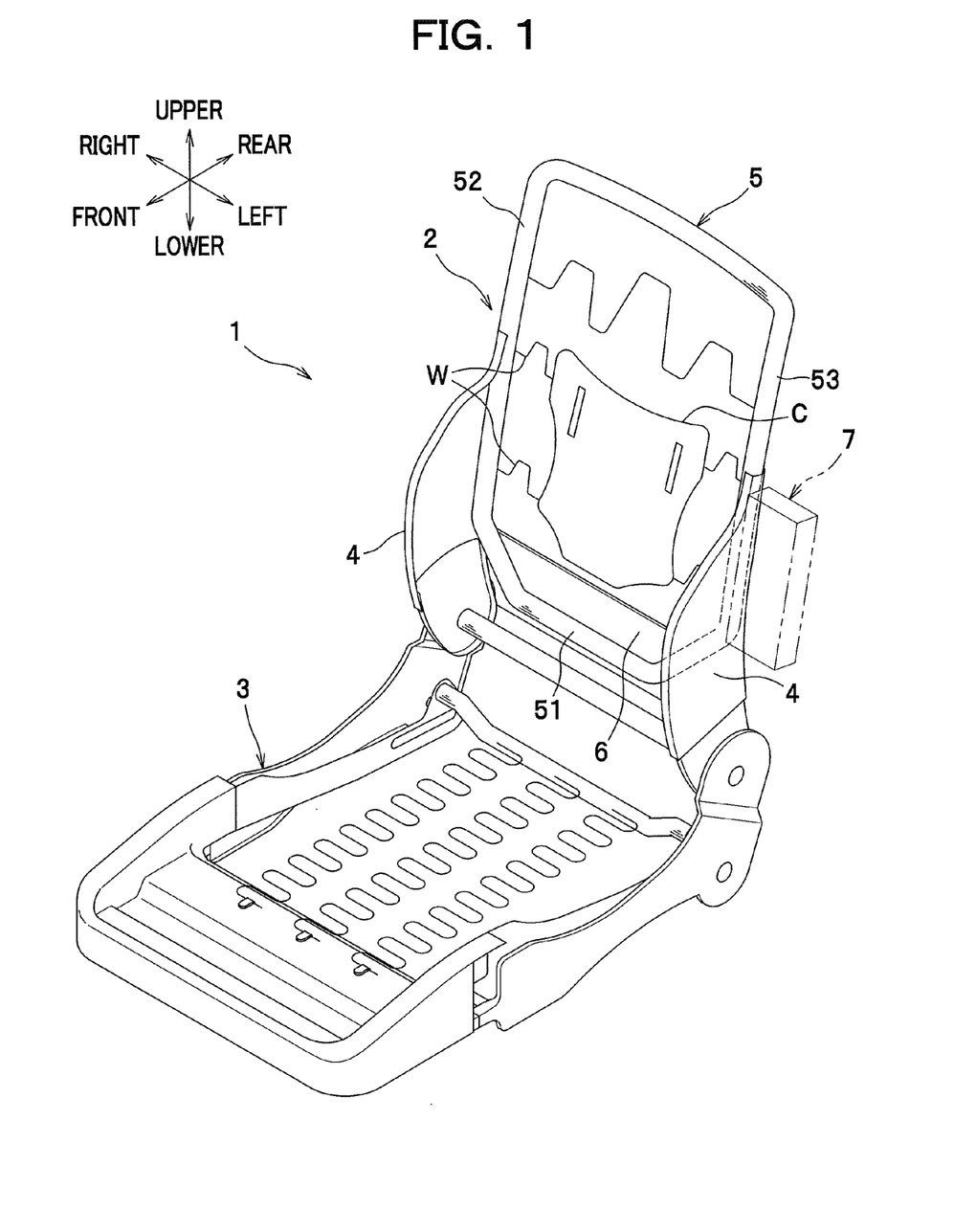
FIG. 1 is a perspective view of a vehicle seat according to one embodiment of the present invention.

A vehicle seat according to the present invention is made up of a seat frame 1 as shown in FIG. 1 the outside of which is covered with a seat cushion made of urethane foam or the like. The seat frame 1 includes a seat back frame 2 and a seat bottom frame 3. It is to be understood that in describing the present invention, the front/rear, left/right and upper/lower are defined as viewed from an occupant sitting on the seat.

The seat back frame 2 is configured to include a pair of side frames 4, a reinforcing frame for reinforcing the side frames 4, that is, a pipe frame 5 as one example of an inner frame, a lower frame 6 as one example of a load transmission part, and a bracket 7 as one example of a force-receiving member.

Figure 2:
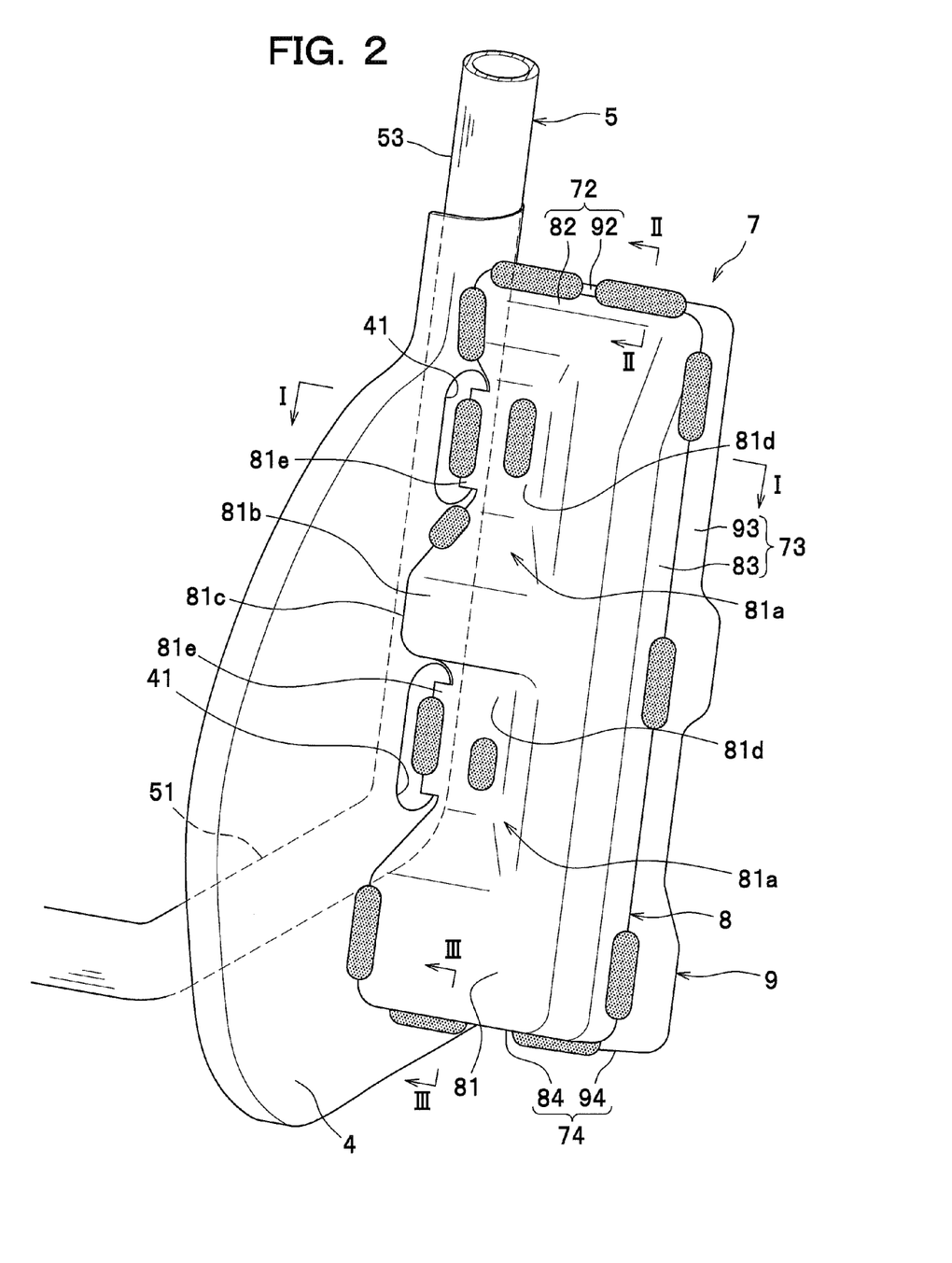
FIG. 2 is an enlarged perspective view of a bracket and its surrounding structure as viewed from the front.

The side frames 4 are plate-like members which constitute left and right lower portions of the seat back frame 2, and each configured to protrude frontward (in at least one of the front and rear directions) beyond the pipe frame 5, as shown in FIG. 2. This configuration provides a frontwardly overhanging shape formed at each side of the seat back, and allows an air bag or other parts to be securely fixed to the frontwardly and rearwardly extending plate-like side frames 4.

To be more specific, as shown in FIG. 3(a), each side frame 4 has a through hole 41 pierced through the left and right sides at an appropriate position thereof, and a front portion 42 thereof is bent inwardly to the left or to the right and further bent to the rear to form a U-shaped cross section. This configuration serves to improve the rigidity of the front portion 42 of the side frame 4.

A rear portion 43 of each side frame 4 is bent inwardly to the left or to the right to form an L-shaped cross section, and is joined to the pipe frame 5 by welding. In FIG. 3(a), welds or spots welded by a welding torch T are illustrated with exaggerated black dots.

As shown in FIG. 1, the pipe frame 5 is a member having a cylindrical shape (with a closed section), which is bent into a shape of a substantially rectangular loop. Left and right lower portions of the pipe frame 5 are disposed adjacent, and joined, to laterally inner sides of the side frames 4, respectively. With this configuration, a lower portion 51 (including portions extending obliquely downward from the portions adjacent to the side frames 4) of the pipe frame 5 is configured to serve, in combination with the lower frame 6, as a load transmission part, to transmit a load to the left or to the right.

Two wires W bent to ascend and descend several times are provided in positions spaced out vertically, and joined to left and right side portions 52, 53 of the pipe frame 5, and a pressure-receiving member C shaped like a plate and made of plastic are fixed to these wires W. With this configuration, when the vehicle receives a rear-end collision load, the occupant subsides rearward together with the receiving member C inside the pipe frame 5, and thus the impact of the rear-end collision load against the occupant can be softened.

The lower frame 6 is a plate-like member extending laterally, which is joined to the lower portions of the side frames 4 and to the lower portion 51 of the pipe frame 5. With this configuration, a load imposed on the bracket 7 from outside in the left or right direction is transmitted through the lower frame 6 and the lower portion 51 of the pipe frame 5 to the side laterally opposite to that on which the bracket 7 is provided.

The bracket 7 is a part provided discretely from the pipe frame 5 and the side frames 4, and disposed adjacent, and joined, to the left side (laterally outer side) of the left side frame 4 (one of the side frames 4). To be more specific, the bracket 7 is disposed near a side panel such as a side pillar or a door of the vehicle, so that a side collision load imposed on the vehicle is received thereby.

Figure 4:
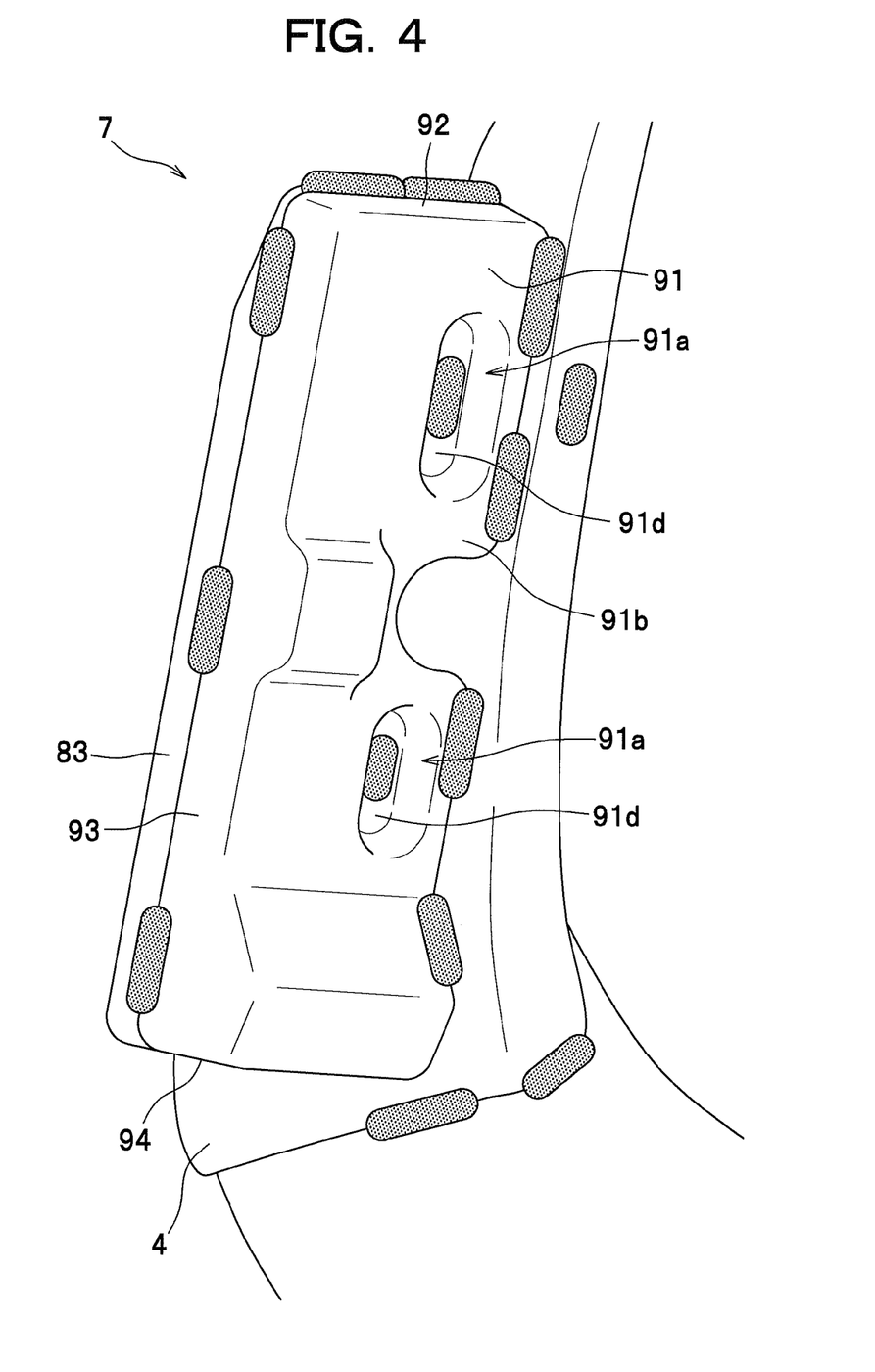
FIG. 4 is an enlarged perspective view of the bracket and its surrounding structure as viewed from the rear.

The bracket 7 is, as shown in FIG. 2, directly fixed by welding to the pipe frame 5 through two through holes 41 as one example of an opening formed in the side frame 4. With this configuration, irrespective of the angle and magnitude of the side collision load received, the load can be transmitted properly from the bracket 7 to the pipe frame 5 without getting affected by deformation of the side frame 4. In FIG. 2 and FIG. 4, the welded spots are illustrated with shades of dots.

To be more specific, the bracket 7 is segmented in front and rear halves of a front-side box-like member 8 and a rear-side box-like member 9 which are fitted together, and configured such that the box-like members 8, 9, once combined together, form a closed section as taken along a plane perpendicular to the lateral direction.

The front-side box-like member 8 includes a plate-like front wall 81 elongated in the upward-and-downward direction longer than extending in the lateral direction, an upper wall 82 extending from an upper end of the front wall 81 rearward, an outer wall 83 extending from an laterally outer end of the front wall 81 rearward, and a lower wall 84 extending from a lower end of the front wall 81 rearward, all of which are provided integrally. In other words, the front-side box-like member 8 is configured to have a shape of a box which opens to the rear and to a laterally inner side.

In the front wall 81, two recessed portions 81a (providing an uneven shape) disposed in a portion separate from upper and lower ends of the front wall 81 and configured to be recessed inwardly in the front-rear direction are arranged in positions spaced out vertically at a predetermined distance. With this configuration, the rigidity of the front wall 81 is enhanced, and thus a side collision load can be transmitted effectively to the pipe frame 5 by the high-rigidity front wall 81. Moreover, since the recessed portions 81a are formed in the portion of the front wall 81 separate from the upper and lower ends thereof, the upper and lower end corners of the front wall 81 can be formed continuously in the left-right direction, so that the continuous corners can effectively transmit the load from outside to inside in the lateral direction.

Each recessed portion 81a is formed at a laterally inner end portion 81b of the front wall 81, and thus opens to the front and to the laterally inner side. With this configuration, an edge 81c of the end portion 81b is bent to the front and to the rear, and thus the rigidity of the edge 81c located at an output side of the side collision load can be increased, so that the side collision load can effectively be transmitted to the pipe frame 5 or the like.

Each recessed portion 81a has a bottom wall 81d, at which an extension portion 81e (part of the force-receiving member provided at a laterally inner side thereof) extending laterally inward beyond the edge 81c of the front wall 81 is formed. This extension portion 81e is disposed inside the through hole 41 of the side frame 4 described above, and extends to the pipe frame 5, so that the extension portion 81e abutting on the pipe frame 5 is welded to the pipe frame 5.

Since only the extension portion 81e is passed through the through hole 41, the through hole 41 may be sized to conform to the extension portion 81e, and thus the through hole 41 may be made smaller so that the rigidity of the side frame 4 can be enhanced. To be more specific, in the present embodiment, the through hole 41 is shaped like an elongate hole having dimensions smaller than the width of the pipe frame 5 in a front-rear direction, and smaller than the whole length of the edge 81c of the front wall 81 and greater than the extension portion 81e in a vertical direction.

The size of the through hole 41 may be designed to have, at the largest, an area comparable or smaller than a cross-sectional area of a laterally inner end portion (adjacent an end located at a side from which the side collision load is outputted) of the bracket 7. The through hole 41 formed to have a size described above makes it possible to impart a higher rigidity of the side frame 4, for example, in comparison with a through hole formed in the side frame to have such a size as to allow the laterally inner end portion of the bracket 7 to be passed through in its entirety.

Although the extension portion 81e is provided in the present embodiment, the present invention is not limited to this configuration; i.e., a configuration without the extension portion 81e may also be possible. In this configuration, some gap may be left between the pipe frame 5 and the edge 81c of the front wall 81, but this gap still permits welding by which the pipe frame 5 and the bracket can be joined directly.

The extension portion 81e is, as shown in FIG. 3(a), fixed to a central portion 5a located at a center in the front-rear direction of the pipe frame 5. With this configuration, the load from the bracket 7 is transmitted intensively to the central portion 5a of the pipe frame 5, and thus the load can be transmitted more effectively.

A center 5b in the front-rear direction of the pipe frame 5 is located within a width in the front-rear direction of the bracket 7. With this configuration, upon side collision, the load can be transmitted more effectively because the bracket 7 can be prevented from slipping out to the front or to the rear on a cylindrical outer surface of the pipe frame 5.

As shown in FIG. 2, an upper portion and a lower portion of the edge 81c of the front wall 81 are fixed to the side frame 4 by welding. In other words, the front wall 81 is fixed directly to both of the side frame 4 and the pipe frame 5. With this configuration, the load received by the bracket 7 is transmitted not only through the pipe frame 5 but also through the side frame 4 to the load transmission part (the lower frame 6 and the lower portion 51 of the pipe frame 5), and thus more effective transmission of the load can be ensured. It is appreciated that the load transmitted to the load transmission part can be transmitted to the vehicle body side through a console box or the like provided at a side opposite to that on which the bracket 7 is provided.

As shown in FIG. 4, the rear-side box-like member 9 includes a plate-like rear wall 91 elongated in the upward-and-downward direction longer than extending in the lateral direction, an upper wall 92 extending from an upper end of the rear wall 91 frontward, an outer wall 93 extending from a laterally outer end of the rear wall 91 frontward, and a lower wall 94 extending from a lower end of the rear wall 91 frontward, all of which are provided integrally. In short, the rear-side box-like member 9 is configured to have a shape of a box which opens to the front and to the laterally inner side.

In the rear wall 91, two recessed portions 91a (providing an uneven shape) disposed in a portion separate from upper and lower ends of the rear wall 91 and configured to be recessed inwardly in the front-rear direction are arranged in positions spaced out vertically at a predetermined distance. With this configuration, the rigidity of the rear wall 91 is enhanced, and thus a side collision load can be transmitted effectively to the laterally inner side by the high-rigidity rear wall 91. Moreover, since the recessed portions 91a are formed in the portion of the rear wall 91 separate from the upper and lower ends thereof, the front and rear end corners of the rear wall 91 can be formed continuously in the left-right direction, so that the continuous corners can effectively transmit the load from outside to inside in the lateral direction.

Each recessed portion 91a is disposed opposite to a corresponding recessed portion 81a of the front-side box-like member 8 in the front-rear direction, whereas each bottom wall 91d and a bottom wall 81d of a corresponding recessed portion 81a are disposed to adjoin to each other, as shown in FIG. 3(a). With this configuration, the two bottom walls 81d, 91d adjoining to each other constitute a thick portion located substantially at the center in the front-rear direction, and thus effective transmission of the side collision load can be achieved.

The two bottom walls 81d, 91d adjoining to each other are joined together by welding. With this configuration, the rigidity of the bracket 7 can be enhanced, and thus effective transmission of the side collision load can be achieved.

The two bottom walls 81d, 91d adjoining to each other are located within a width in the front-rear direction of the pipe frame 5. With this feature, the side collision load can be effectively transmitted to the pipe frame 5 through the thick portion made up of the joined bottom walls 81d, 91d.

Furthermore, the center 5b in the front-rear direction of the pipe frame 5 is located within a width in the front-rear direction of the thick portion made up of the joined bottom walls 81d, 91d. With this configuration, the load can be transmitted intensively to the center 5b or thereabout of the pipe frame 5 through the thick portion made up of the joined bottom walls 81d, 91d.

As shown in FIG. 4, a laterally inner end 91b of the rear wall 91 is fixed to the side frame 4 by welding. To be more specific, as shown in FIG. 3(a), the laterally inner end 91b of the rear wall 91 is joined to a closed section shaped portion made up of a rear portion 43, bent into an L-shape, of the side frame 4 and a left-side rear portion of the pipe frame 5. With this configuration, the side collision load transmitted from the rear wall 91 to a laterally inner side is received properly by the closed section shaped portion, and thus can be transmitted effectively to the pipe frame 5.

Figure 3:
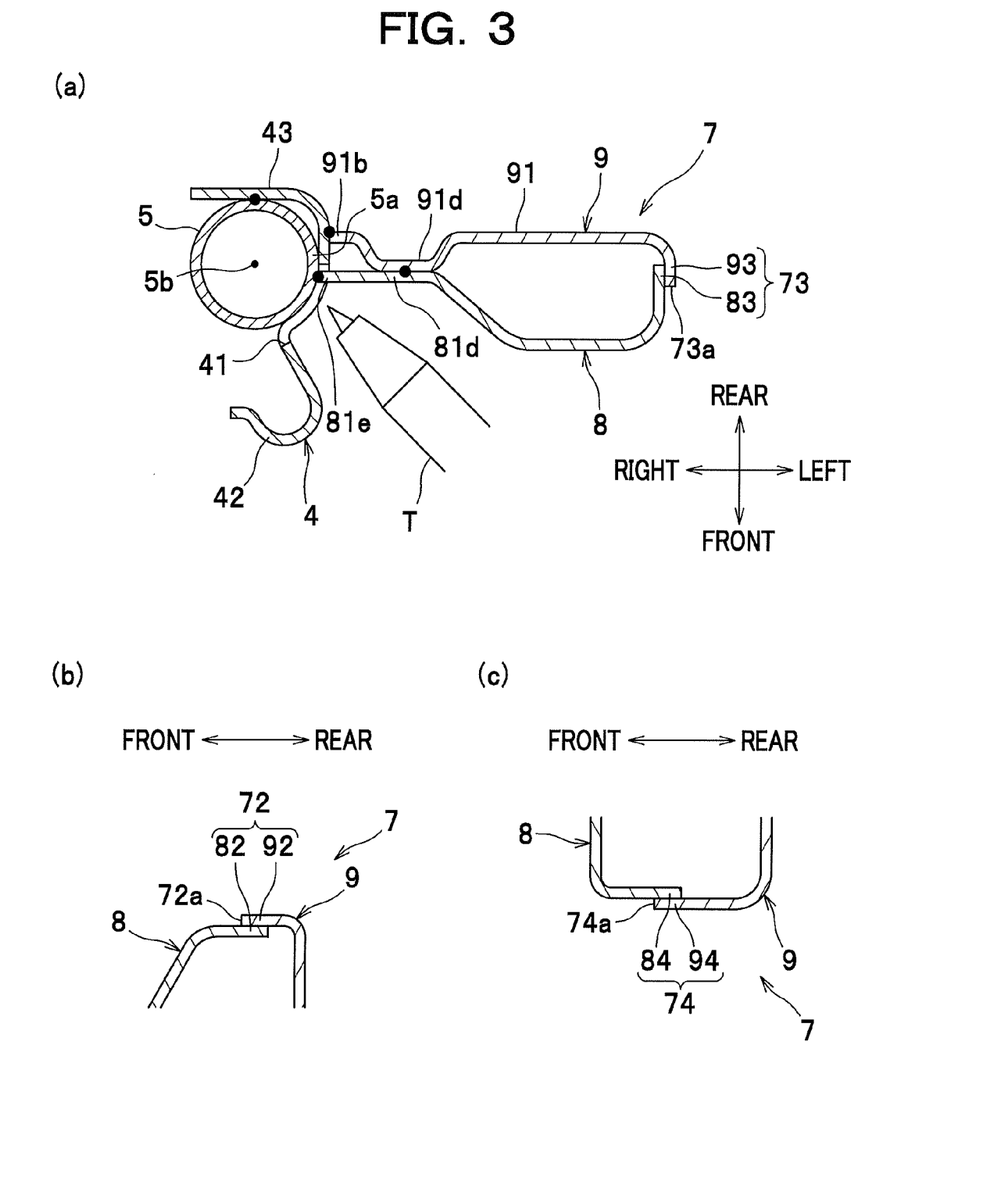
FIG. 3 shows (a) section I-I, (b) section II-II, and (c) section III-III of FIG. 2.

Furthermore, as shown in FIGS. 2, 3, the upper wall 92, outer wall 93 and lower wall 94 of the rear-side box-like member 9 is disposed over the upper wall 82, outer wall 83 and lower wall 84 of the front-side box-like member 8, and fixed to the walls 82-84, respectively by welding.

With this configuration, as shown in FIG. 3(b), the upper wall 72 of the bracket 7 has a stepped profile 72a (providing an uneven shape) formed, at a position separate from the front and rear ends thereof, by overlapping the upper walls 82, 92 (two plate-like portions) of the respective box-like members 8, 9. With this configuration, a portion of the upper wall 72 substantially at the center thereof in the front-rear direction is formed as a thick portion by overlapping the upper walls 82, 92, and thus the rigidity of the upper wall 72 can be enhanced, so that a side collision load can be transmitted effectively.

Furthermore, since the stepped profile 72a (providing an uneven shape) is formed in a position separate from the front and rear ends of the upper wall 72, the front and rear end corners of the upper wall 72 can be formed continuously in the left-right direction, so that the continuous corners can effectively transmit the load from outside to inside in the lateral direction.

Similarly, as shown in FIGS. 3(a), (c), the outer wall 73 and lower wall 74 of the bracket 7 also has stepped profiles 73a, 74a formed by overlapping the outer walls 83, 93 and the lower walls 84, 94, respectively, of the box-like members 8, 9. With this configuration, the rigidities of the outer wall 73 and the lower wall 74 as well can be enhanced, and the front and rear end corners of the lower wall 74 can be formed continuously in the left-right direction, so that the continuous corners can effectively transmit the load from outside to inside in the lateral direction.

The stepped profiles 72a, 73a, 74a are formed continuously across the upper wall 72, outer wall 73 and lower wall 74 of the bracket 7 as a result of fitting the rear-side box-like member 9 on the front-side box-like member 8. With this configuration, the thick portion of the outer wall 73 is formed continuously to the thick portions of the upper wall 72 and the lower wall 74, and thus a side collision load received by the thick portion of the outer wall 73 can be transmitted effectively to the laterally inner side through the upper and lower continuous thick portions.

Advantageous effects of the vehicle seat according to the present embodiment as described above are summarized hereinafter.

Since the bracket 7 is not fixed through the side frame 4 but fixed directly to the pipe frame 5, the side collision load received, irrespective of its angle and magnitude, can be transmitted properly from the bracket 7 to the pipe frame 5 without getting affected by deformation of the side frame 4.

Since the bracket 7 is provided discretely from the pipe frame 5, each member can be formed into any shape freely, and can be made easy to assemble.

Since the bracket 7 and the pipe frame 5 are fixed together through an opening (through hole 41) formed in the side frame 4, the need, for example, to divide the side frame 4 into front and rear parts or upper and lower parts so as to detour around a position in which the bracket and the pipe frame are fixed together can be obviated, and thus the rigidity of the side frame 4 can be enhanced.

Since the opening formed in the side frame 4 is configured as a through hole 41, the rigidity of the side frame 4 can be further enhanced, in comparison with a configuration in which the opening is shaped as a groove (or a hollow) that opens to the front or to the rear, because an upper portion and a lower portion of the side frame 4 above and below the position in which the bracket 7 and the pipe frame 5 are fixed together can be connected at the front and rear sides of that position.

Since the bracket 7 is fixed to a portion of the pipe frame 5 having a shape with a closed section, the load received by the bracket 7 can be transmitted properly to the load transmission part (the lower frame 6 and the lower portion 51 of the pipe frame 5) through the pipe frame 5 which can be resistant to deformation.

Since the bracket 7 is fixed directly to the both of the side frame 4 and the pipe frame 5, the load received by the bracket 7 is transmitted not only through the pipe frame 5 but also through the side frame 4 to the load transmission part, so that the load can be transmitted more effectively.

Since the center 5b of the pipe frame is located within the width in the front-rear direction of the bracket 7, the bracket 7 upon receipt of side collision load can be prevented from slipping out to the front or to the rear on a cylindrical outer surface of the pipe frame 5, so that the load can be transmitted more effectively.

Since the bracket 7 is fixed to the portion 5a located at a center in the front-rear direction of the pipe frame 5, the load from the bracket 7 can be transmitted intensively to the central portion 5a at the center in the front-rear direction of the pipe frame 5, so that the load can be transmitted more effectively.

Although the embodiment of the present invention has been described above, the present invention may be carried out into practice in appropriately modified configurations, as in the other embodiments described below.

In the above-described embodiment, a cylindrical pipe frame 5 is adopted as an inner frame, but the present invention is not limited to this configuration; for example, a pipe frame having a polygonal cross section, a solid cylindrical member, or a solid prismatic member may be usable.

In the above-described embodiment, the force-receiving member is embodied in the bracket 7 composed of two box-like members 8, 9, but the present invention is not limited to this configuration; for example, a bracket composed of a single box-like member, or a bulky plate-like member may be usable.

In the above-described embodiment, the load transmission part is configured as an assembly of the lower frame 6 and the lower portion 51 of the pipe frame 5, but the present invention is not limited to this configuration. For example, in the above-described embodiment, the pipe frame 5 as the inner frame is formed integrally with the load transmission part (lower portion 51), but if the pipe frame is shaped like a letter U which opens toward downward, a separate frame connecting the lower end portions of the pipe frame may be provided as a load transmission part. Alternatively, if the lower portion 51 of the pipe frame 5 in the above-described embodiment is severed, with its midsection cut off, in two portions joined to the lower frame 6, the lower portions 51 extending halfway and the lower frame 6 may be configured as a load transmission part.

In the above-described embodiment, the bracket 7 and the pipe frame 5 are fixed together by welding, but the present invention is not limited to this configuration; for example, a bolt may be applied for fixing these members together.

In the above-described embodiment, the through hole 41 is configured to serve as an opening, but the present invention is not limited to this configuration; for example, the opening may be a hollow which opens to the front or to the rear.

In the above-described embodiment, part of the bracket 7 (i.e., extension portions 81e) is passed through the opening (through holes 41), but the present invention is not limited to this configuration; part of the inner frame may be passed through the opening and fixed directly to the bracket.

In the above-described embodiment, the inner frame (pipe frame 5) is configured to have a shape with a closed section in its entirety, but the present invention is not limited to this configuration; it may be advantageous only if at least a portion of the inner frame to which the force-receiving member is fixed has a shape with a closed section.

The invention claimed is:

1. A vehicle seat comprising:
left and right side frames which constitute left and right lower portions of a seat back frame;
an inner frame disposed adjacent to a lateral inner side of one of the side frames;
a force-receiving member disposed adjacent to a lateral outer side of the one of the side frames, and configured to receive a load from outside in a lateral direction; and
a load transmission part configured to transmit the load from the force-receiving member to a side laterally opposite to that on which the force-receiving member is provided,
wherein the force-receiving member is directly fixed to the inner frame;
wherein the force-receiving member and the inner frame are fixed together through an opening formed in the side frame; and
wherein the force-receiving member includes an extension portion provided on a lateral inner side of the force-receiving member, and extending through the opening to the inner frame, the extension portion being fixed to the inner frame.

2. The vehicle seat according to claim 1, wherein the opening is a through hole.

3. The vehicle seat according to claim 1, wherein at least a portion of the inner frame to which the force-receiving member is fixed has a shape with a closed section.

4. The vehicle seat according to claim 1, wherein the force-receiving member is fixed directly to both of the side frames.

5. The vehicle seat according to claim 1, wherein a center in a front-rear direction of the inner frame is located within a width in the front-rear direction of the force-receiving member.

6. The vehicle seat according to claim 1, wherein the force-receiving member is fixed to a portion at a center in a front-rear direction of the inner frame.

7. A vehicle seat comprising:
- left and right side frames which constitute left and right lower portions of a seat back frame;
- an inner frame disposed adjacent to a lateral inner side of one of the side frames;
- a force-receiving member disposed adjacent to a laterally outer side of the one of the side frames, and configured to receive a load from outside in a lateral direction; and
- a load transmission part configured to transmit the load from the force-receiving member to a side laterally opposite to that on which the force-receiving member is provided,
- wherein the force-receiving member is directly fixed to the inner frame; and
- wherein the force-receiving member and the inner frame are fixed together through an opening formed in the side frame, with a weld.

* * * * *